US008122708B2

(12) United States Patent
Okada et al.

(10) Patent No.: US 8,122,708 B2
(45) Date of Patent: Feb. 28, 2012

(54) EXHAUST GAS PURIFICATION DEVICE (75) Inventors: Shusuke Okada, Osaka (JP); Masato Kitazaki, Osaka (JP); Hiroshi Uehara, Osaka (JP); Osamu Kawatate, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 818 days.

(21) Appl. No.: 12/093,171

(22) PCT Filed: Oct. 19, 2006

(86) PCT No.: PCT/JP2006/320867
§ 371 (c)(1),
(2), (4) Date: Jul. 14, 2008

(87) PCT Pub. No.: WO2007/058047
PCT Pub. Date: May 24, 2007

(65) Prior Publication Data
US 2009/0151325 A1 Jun. 18, 2009

(30) Foreign Application Priority Data
Nov. 11, 2005 (JP) .................................. 2005-327885

(51) Int. Cl.
*F01N 3/00* (2006.01)
(52) U.S. Cl. ................................ 60/286; 60/295; 60/303
(58) Field of Classification Search .................... 60/286, 60/311, 297, 295; 95/1; 96/417, 419
See application file for complete search history.

(56) References Cited

U.S. PATENT DOCUMENTS

| 6,871,489 | B2 * | 3/2005 | Tumati et al. | 60/285 |
| 7,412,889 | B2 * | 8/2008 | Daoud | 73/584 |
| 2004/0031386 | A1 * | 2/2004 | Rauchfuss et al. | 95/1 |
| 2005/0022511 | A1 * | 2/2005 | Miura | 60/285 |
| 2005/0044846 | A1 * | 3/2005 | Yahata et al. | 60/295 |
| 2005/0072141 | A1 * | 4/2005 | Kitahara | 60/297 |
| 2008/0018442 | A1 * | 1/2008 | Knitt | 340/438 |

FOREIGN PATENT DOCUMENTS

| GB | 2 017 916 A | 10/1979 |
| JP | 7-189654 | 7/1995 |
| JP | 08-121150 | 5/1996 |
| JP | 2002-97930 | 4/2002 |
| WO | WO 99/16538 | 4/1999 |
| WO | WO 2004/026434 | 4/2004 |

OTHER PUBLICATIONS

International Search Report for International Application No. PCT/JP2006/320867, Japanese Patent Office, mailed Jan. 23, 2007, 2 pgs.

* cited by examiner

*Primary Examiner* — Thomas Denion
*Assistant Examiner* — Patrick Maines
(74) *Attorney, Agent, or Firm* — Sterne, Kessler, Goldstein & Fox PLLC (57) ABSTRACT

An exhaust gas purification device having a DPF provided in an exhaust system of an internal combustion engine. The device has one or more sound pressure measurement means for measuring exhaust sound pressure and calculation means for calculating the amount of PM accumulation based on the exhaust sound pressure measured. On the upstream side of the DPF are arranged exhaust gas temperature measurement means and exhaust gas temperature raising means. The exhaust gas temperature raising means is activated when the amount of PM accumulation calculated by the calculation means is higher than a preset default and at the same time when the exhaust gas temperature measured by the exhaust temperature measurement means is lower than a lower limit of a temperature region in which the DPF can be regenerated.

8 Claims, 7 Drawing Sheets

EXHAUST GAS PURIFICATION DEVICE

BACKGROUND OF THE INVENTION

1. Field of the Invention

The present invention relates to an art of an exhaust gas purification device comprising a particulate filter configured to collect particulate matter in exhaust gas and disposed in an exhaust system of an internal combustion engine such as a diesel engine.

2. Background Art

Conventionally, a particulate filter (hereinafter, referred to as DPF) is disposed in an exhaust system of an internal combustion engine so as to collect and remove particulate matter (hereinafter, referred to as PM) in exhaust gas. With respect to judging PM accumulation amount of the DPF, there is a well-known method of measuring pressure difference between the front and rear sides of the DPF (for example, see the Patent Literature 1) and a method calculating from an already-known PM discharge amount map of the engine and an engine drive record (for example, see the Patent Literature 2). Following the measured results, "DPF renewal" removing accumulated PM is performed.

Patent Literature 1: the Japanese Patent Laid Open Gazette Hei. 7-189654
Patent Literature 2: the Japanese Patent Laid Open Gazette 2002-97930

BRIEF SUMMARY OF THE INVENTION

Disclosure of Invention

Problems to be Solved by the Invention

However, in the case of measuring pressure difference between the front and rear sides of the DPF, pressure difference is changed following engine driving status, such as engine load and rotation speed, whereby it is necessary to change threshold of PM accumulation amount judgment following the driving status. Then, means measuring engine rotation speed, load, back pressure, pressure difference between the front and rear sides of the DPF and the like are necessary separately. Stabilization of pressure difference requires a lot of time, that is, measurement of PM accumulation amount requires a lot of time, whereby the optimal measurement of PM accumulation amount following the driving status cannot be performed.

Then, the purpose of the present invention is to provide an exhaust gas purification device comprising a measurement means of PM accumulation amount of a DPF superior to pressure difference measurement in sensibility and responsibility.

Means for Solving the Problems

The above-mentioned problems are solved by the following means.

With regard to the present invention, an exhaust gas purification device comprising a DPF and disposed in an exhaust system of an internal combustion engine, further comprises one or more sound pressure measurement means measuring exhaust sound pressure, and a calculation means calculating PM accumulation amount from the exhaust sound pressure.

With regard to the present invention, an exhaust gas temperature measurement means and an exhaust gas temperature raising means are disposed at an upstream side of the DPF, and when the PM accumulation amount calculated by the calculation means is higher than a predetermined value and the exhaust gas temperature measured by the exhaust gas temperature measurement means is lower than a renewable temperature range lower limit of the DPF, the exhaust gas temperature raising means is actuated.

With regard to the present invention, a storage means storing a sound pressure map of the upstream side of the DPF corresponding to driving state of the internal combustion engine is disposed, the one sound pressure measurement means is disposed at the upstream side of the DPF, and the calculation means calculates PM accumulation amount from exhaust sound pressure measured by the sound pressure measurement means and the sound pressure map.

With regard to the present invention, the storage means storing the sound pressure map of the upstream side of the DPF corresponding to driving state of the internal combustion engine is disposed, the one sound pressure measurement means is disposed at a downstream side of the DPF, and the calculation means calculates PM accumulation amount from exhaust sound pressure measured by the sound pressure measurement means and the sound pressure map.

With regard to the present invention, exhaust sound pressure is measured in all measurable frequency bands or a part of the frequency band of the sound pressure measurement means.

With regard to the present invention, exhaust sound pressure is measured by the sound pressure measurement means about a plurality of frequency bands, and the calculation means calculates PM accumulation amount from the sound pressure of a plurality of the frequency bands.

With regard to the present invention, the frequency band of the sound pressure measured by the sound pressure measurement means is changed following rotation speed of the internal combustion engine.

With regard to the present invention, the frequency band of the exhaust sound pressure measured by the sound pressure measurement means is changed following temperature of exhaust gas.

Effect of the Invention

The above-mentioned problems are solved by the following means according to the present invention.

Compared with the conventional case of measuring pressure difference, measurement of exhaust sound pressure has high sensitivity and high responsibility according to the present invention. Accordingly, PM accumulation amount is decided in a moment. PM accumulation amount can be decided under transient driving.

According to the present invention, PM accumulation amount is decided from measured result of exhaust sound pressure having high responsibility and the exhaust gas temperature raising means is actuated frequently, whereby fuel consumption is prevented from being worsened.

According to the present invention, PM accumulation amount of the DPF is recognized by disposing the one sound pressure measurement means so as to reduce cost.

According to the present invention, PM accumulation amount of the DPF is recognized by disposing the one sound pressure measurement means so as to reduce cost.

According to the present invention, accuracy of sound pressure measurement is improved without revising influence of rotary speed.

According to the present invention, sound pressure is measured accurately.

DETAILED DESCRIPTION OF THE INVENTION

Next, explanation will be given on an embodiment of the present invention.

Figure 1:
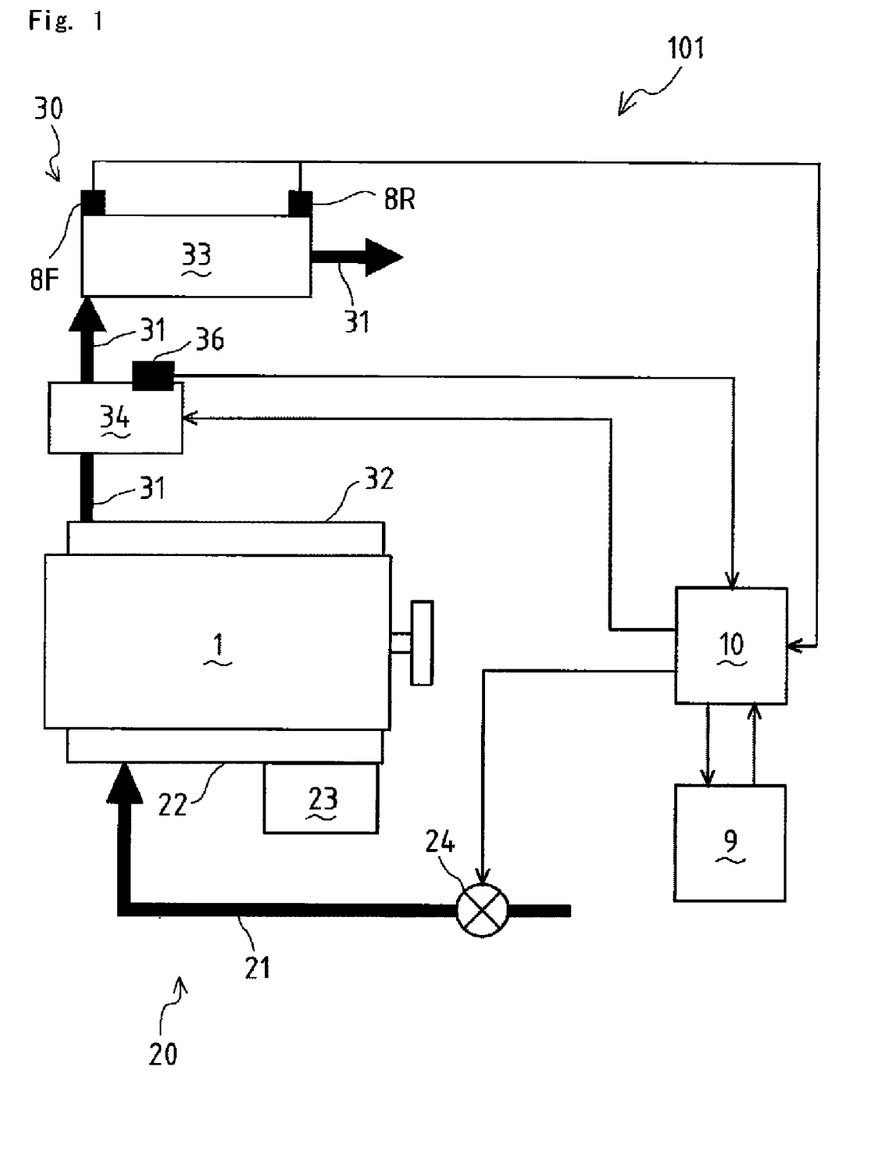
FIG. 1 is a schematic drawing of an exhaust gas purification device 101 of the first embodiment.
Figure 2:
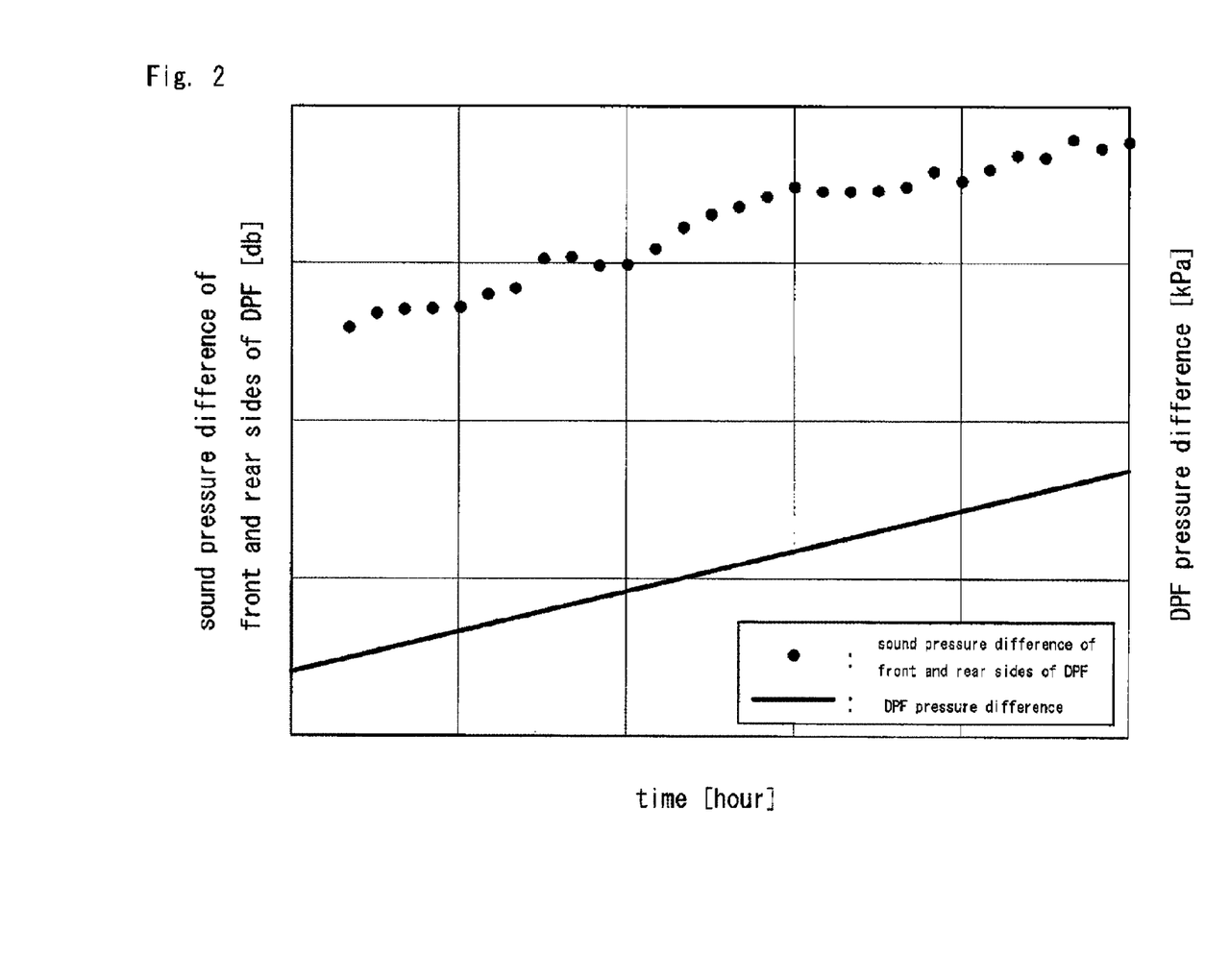
FIG. 2 is a diagram of relation of working time of a DPF 33 and sound pressure difference between front and rear sides of the DPF 33.
Figure 3:
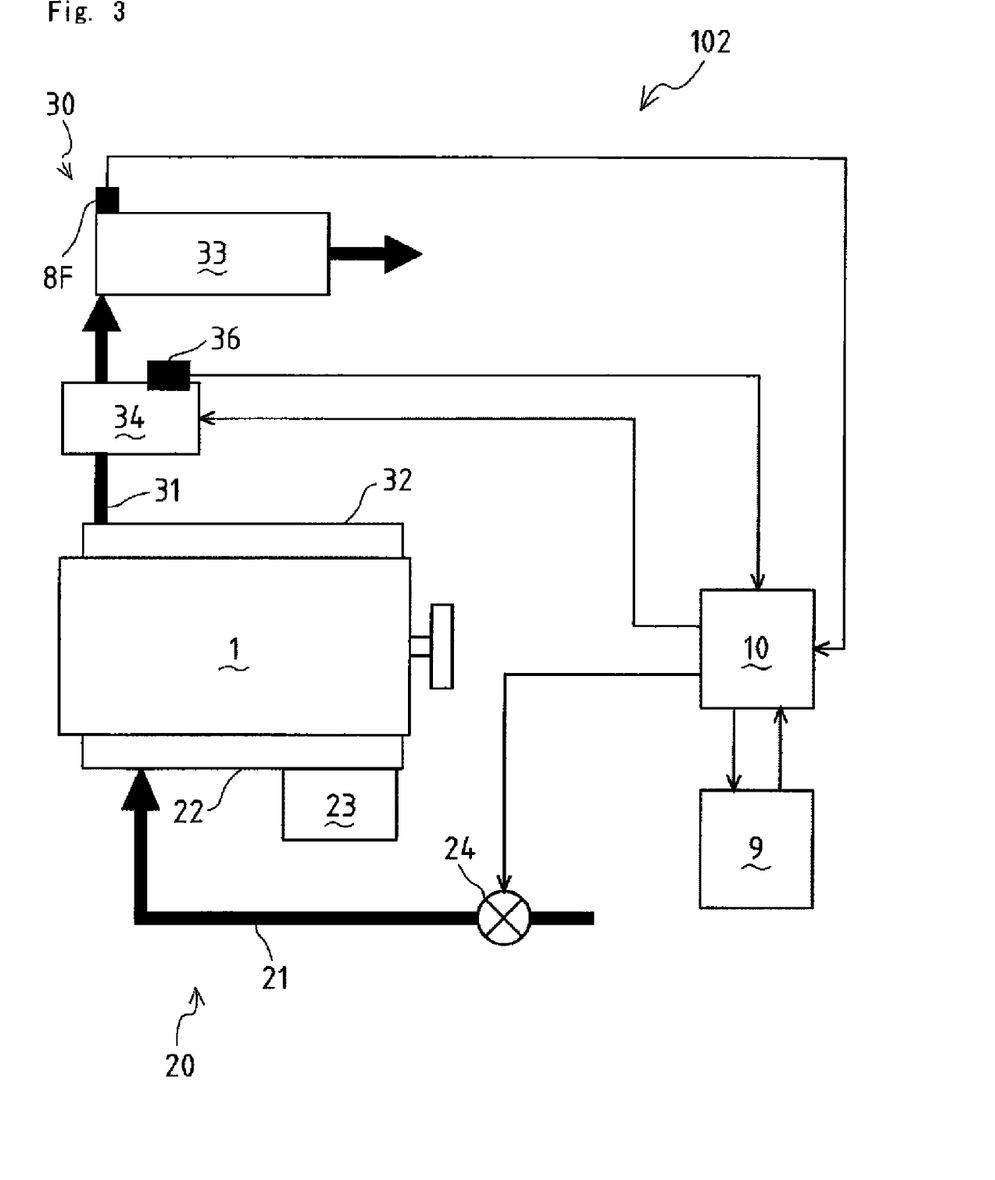
FIG. 3 is a schematic drawing of an exhaust gas purification device 102 of the second embodiment.
Figure 4:
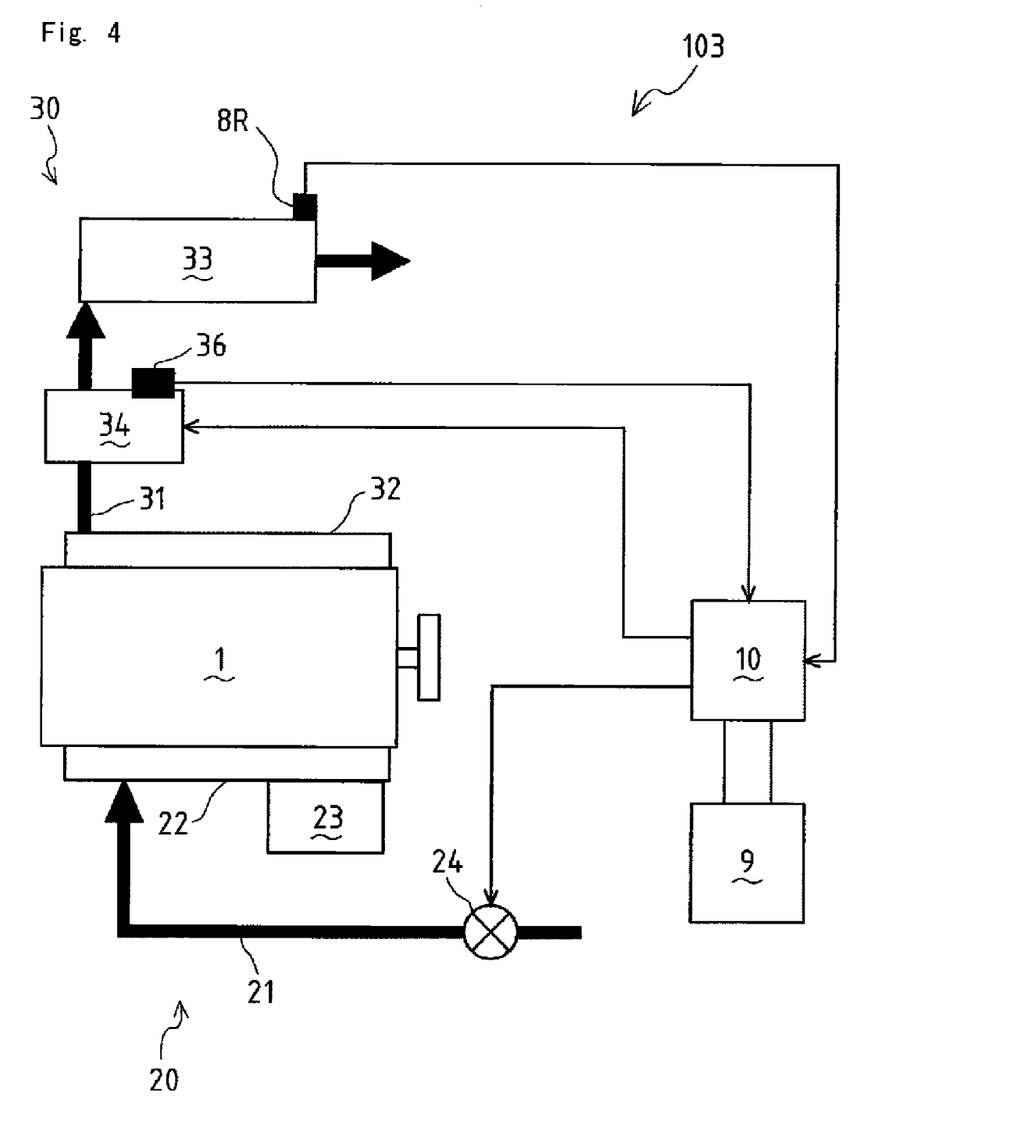
FIG. 4 is a schematic drawing of an exhaust gas purification device 103 of the third embodiment.
Figure 5:
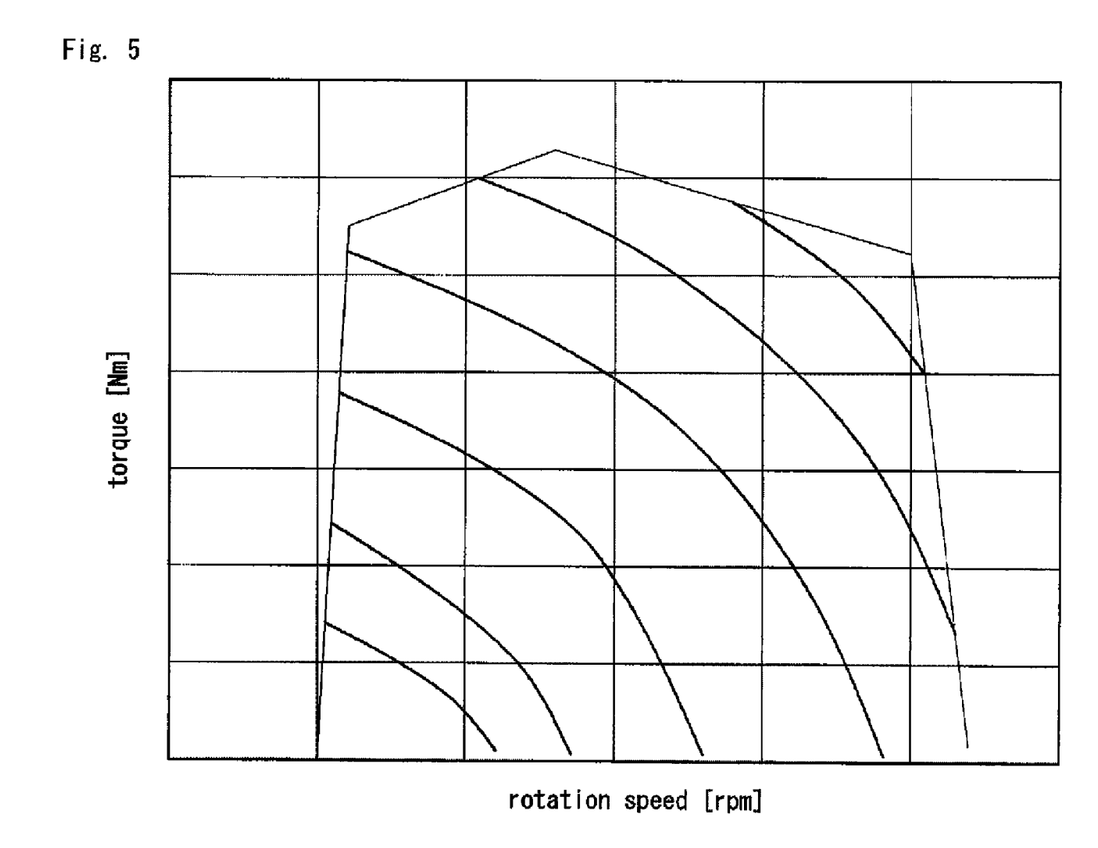
FIG. 5 is a diagram of sound pressure contour corresponding to engine rotation speed and torque in the state that PM is not accumulated in the DPF 33.
Figure 6:
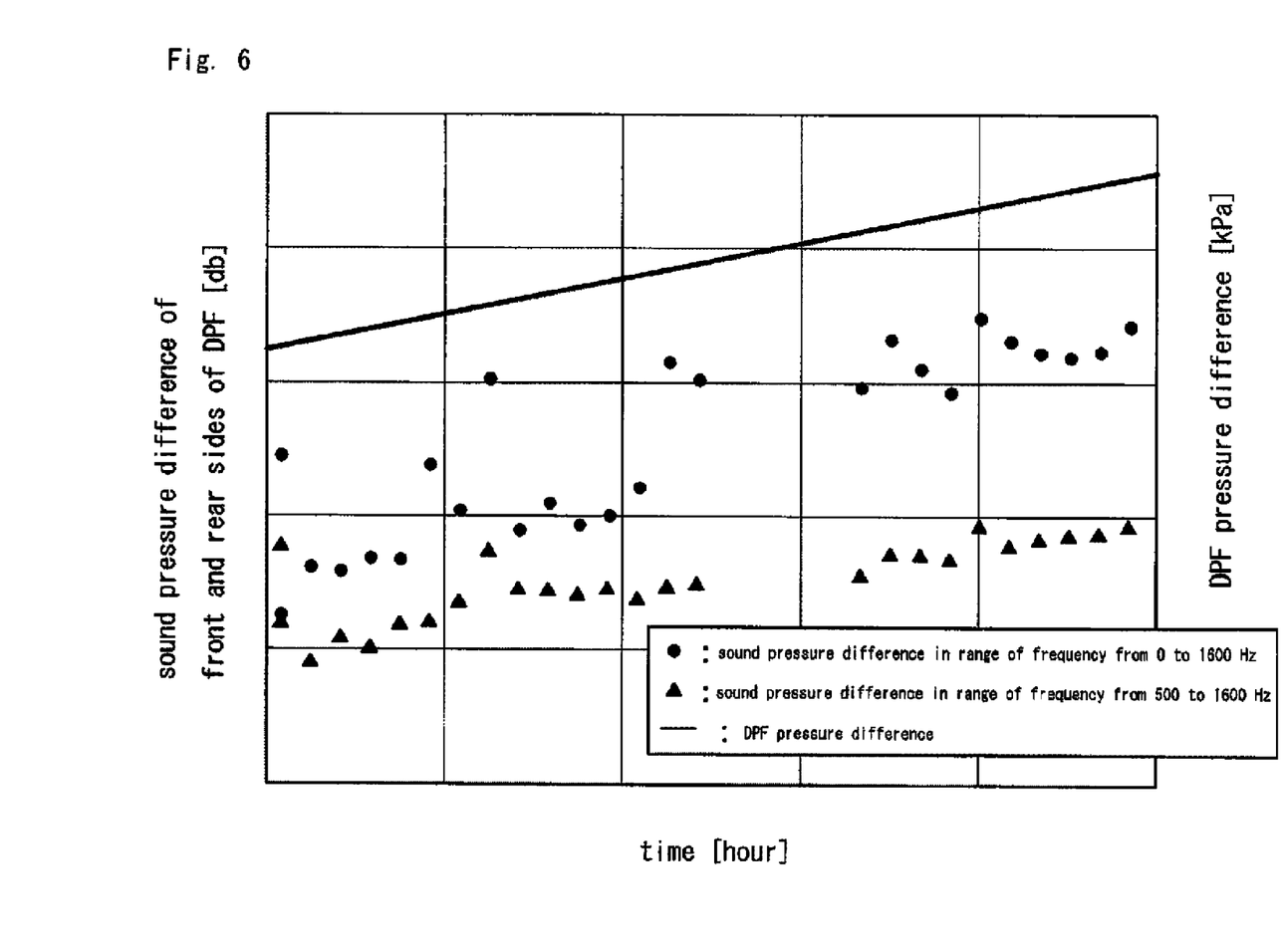
FIG. 6 is a diagram of relation of working time of the DPF 33 and sound pressure difference between the front and rear sides of the DPF 33 calculated from measured results of all the measurable frequency or a part of frequency band.
Figure 7:
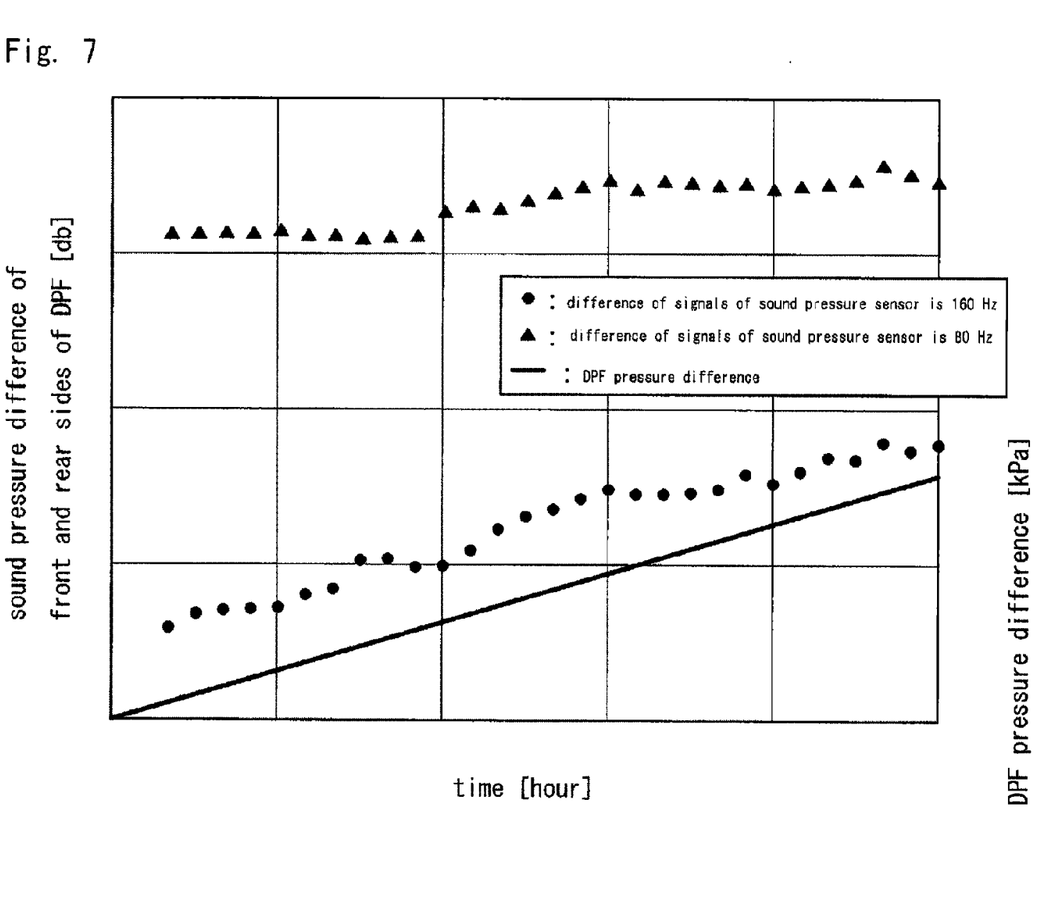
FIG. 7 is a diagram of relation of working time of the DPF 33 and sound pressure difference between the front and rear sides of the DPF 33 measured about two types of frequency.

FIG. 1 is a schematic drawing of an exhaust gas purification device 101 of the first embodiment. FIG. 2 is a diagram of relation of working time of a DPF 33 and sound pressure difference between front and rear sides of the DPF 33. FIG. 3 is a schematic drawing of an exhaust gas purification device 102 of the second embodiment. FIG. 4 is a schematic drawing of an exhaust gas purification device 103 of the third embodiment. FIG. 5 is a diagram of sound pressure contour corresponding to engine rotation speed and torque in the state that PM is not accumulated in the DPF 33. FIG. 6 is a diagram of relation of working time of the DPF 33 and sound pressure difference between the front and rear sides of the DPF 33 calculated from measured results of all the measurable frequency or a part of frequency band. FIG. 7 is a diagram of relation of working time of the DPF 33 and sound pressure difference between the front and rear sides of the DPF 33 measured about two types of frequency.

The exhaust gas purification device of the present invention is disposed in an exhaust system, comprises a DPF 33 collecting particulate matter in exhaust gas, and recognizes PM accumulation amount of the DPF 33.

The embodiment explains exhaust gas purification devices 101, 102 and 103 each of which is mounted in a diesel engine 1 for a tractor. However, an engine to which each of the exhaust gas purification devices 101, 102 and 103 is not limited to the diesel engine 1 and may be a gas engine, a gasoline engine or the like. The present invention may be adopted to an engine mounted in a vehicle, a generator or the like.

Embodiment 1

As shown in FIG. 1, with regard to an internal combustion engine such as a diesel engine, an induction system 20 is connected to one of sides (lower side in the drawing) of the engine main body 1, and an exhaust system 30 is connected to the other side (upper side in the drawing) thereof.

The induction system 20 comprises induction piping 21, an induction manifold 22 and a fuel pump 23. Air is inducted through the induction piping 21 and the induction manifold 22 into a cylinder of the engine main body 1 (a cylinder at inhalation process). Subsequently, at the time of finishing compression process of the cylinder, fuel is pressingly sent from the fuel pump 23 to a combustion chamber so that expansion process is performed following self-ignition combustion of fuel air mixture in the combustion chamber.

An induction throttle device 24 is disposed in the induction piping 21. Concretely, the induction throttle device 24 comprises a butterfly valve (not shown) and an actuator (not shown) rotating the butterfly valve so as to change area of a flow passage of the induction piping 21. Instead of the butterfly valve, various valve mechanisms such as a shutter valve may be adopted.

The induction throttle device 24 regulates supply amount of air to the cylinder so as to regulate air fuel ratio.

The exhaust system 30 comprises an exhaust manifold 32 and exhaust piping 31. At exhaust process after the above-mentioned expansion process, exhaust gas discharged from the cylinder to the exhaust manifold 32 passes through the exhaust piping 31 and is discharged to the atmosphere.

The exhaust piping 31 comprises the DPF 33 collecting PM included in exhaust gas and an exhaust gas temperature raising means 34. The DPF 33 is constructed so that a filter main body is housed in a casing, and the filter main body is honeycomb structure having many cells divided by filtration partitions.

Concretely, for example, each of a part of the cells is blocked one of ends thereof, and each of the other cells is blocked the other end thereof so that PM is accumulated when exhaust gas passes between the cells. For constituting the filter main body, material having thermal resistance, oxidation resistance and thermal shock resistance is suitable, and for example, porous cordierite ceramics, silicon carbide, alumina, mullite, silicon nitride or sintered alloy is adoptable.

The filter main body supports oxidization catalyst such as platinum. When exhaust gas temperature is higher than predetermined temperature (for example about 300° C., hereinafter referred to as "renewable temperature range lower limit"), a chemical reaction is performed, that is, PM is oxidized and removed so as to renew the function of the DPF 33.

As a feature of the exhaust system 30, sound pressure sensors (sound pressure measurement means) 8F and 8R are disposed in the DPF 33 as shown in FIG. 1. In detail, each of the sound pressure sensors 8F and 8R is constructed by a microphone or the like and is disposed in the DPF 33 or at the upstream or downstream side of the DPF 33 inside the exhaust piping 31 so as to measure exhaust sound pressure (loudness or volume of exhaust sound) in the DPF 33 or at the upstream or downstream side of the DPF 33 inside the exhaust piping 31.

The exhaust gas temperature raising means (exhaust gas heating means) 34 is disposed at the upstream side of the DPF 33 in the exhaust piping 31. The exhaust gas temperature raising means 34 is constructed by an electric heater or the like and generates heat by electric power from a generator (alternator) (not shown) so as to heat exhaust gas flowing in the exhaust piping 31. Concretely, exhaust gas may be heated indirectly by heating the exhaust piping 31, or exhaust gas may be heated directly by heating wire disposed in the exhaust piping 31. As the exhaust gas temperature raising means 34, a flame burner may be adopted.

An exhaust gas temperature measurement sensor (exhaust gas temperature measurement means) 36 is disposed in the exhaust gas temperature raising means 34. The exhaust gas temperature measurement sensor 36 may be arranged inside the exhaust gas temperature raising means 34, or may alternatively be attached in the exhaust piping 31 at the upstream side of the DPF 33.

The exhaust gas temperature measurement sensor 36 measures whether the temperature of exhaust gas is higher or lower than the renewable temperature range lower limit of the DPF 33 so as to recognize whether the renewal of the DPF 33 is performed or not.

The sound pressure sensors 8F and 8R, the exhaust gas temperature measurement sensor 36 and the exhaust gas temperature raising means 34 are connected to a calculation means 10. The calculation means 10 receives a signal of sound pressure measured by the sound pressure sensors 8F and 8R and calculates PM accumulation amount of the DPF 33 based on the signal and a sound pressure map stored in a later-discussed storage means 9. The PM accumulation amount of the DPF 33 is amount of PM sticking to the many cells formed in the DPF 33.

When PM accumulation amount of the DPF 33 is judged to be higher than predetermined value, the calculation means 10 receives a signal of exhaust gas temperature from the exhaust gas temperature measurement sensor 36 and judges whether the exhaust gas temperature is higher than the renewable temperature range lower limit of the DPF 33 or not based on the signal. When the exhaust gas temperature is lower than the renewable temperature range lower limit, the exhaust gas temperature raising means 34 is actuated so as to raise temperature of exhaust gas flowing in the exhaust piping 31.

The storage means 9 is connected to the calculation means 10 and stores data of sound pressure maps corresponding to engine rotation speed, torque and exhaust gas temperature. The sound pressure maps are correlation tables between PM accumulation amount of the DPF 33 and exhaust sound pressure made about engine rotation speed, torque and exhaust gas temperature. In other words, the sound pressure maps are conversion tables for finding PM accumulation amount of the DPF 33 from measured exhaust sound pressure.

The calculation means 10 calls the sound pressure maps from the storage means 9 at need so as to calculate PM accumulation amount of the DPF 33 from a signal of exhaust sound pressure.

With regard to this embodiment, the front sound pressure sensor 8F is disposed in the exhaust piping 31 just before (just upstream) the DPF 33 and the rear sound pressure sensor 8R is disposed just behind (just downstream) the DPF 33 as shown in FIG. 1. However, the disposition positions are not limited thereto. With regard to the exhaust gas purification devices 101 shown in FIG. 1, the front sound pressure sensor 8F measures exhaust sound pressure (loudness of sound: db) just before the DPF 33, and the rear sound pressure sensor 8R measures exhaust sound pressure (loudness of sound: db) just behind the DPF 33. The measured results of sound pressure is transmitted to the calculation means 10 and the calculation means 10 calculates sound pressure difference between the front and rear sides of the DPF 33 from the received signal.

As shown in FIG. 2, with regard to the DPF 33 used without renewing, sound pressure difference between the front sound pressure sensor 8F at the upstream side of the DPF 33 and the rear sound pressure sensor 8R at the downstream side of the DPF 33 is increased following an increase of working time. That is because PM accumulation amount of the DPF 33 is increased following increase of working time and the filters in the DPF 33 are clogged so that exhaust sound pressure transmitted from the engine before the DPF 33 is obstructed by the DPF 3, whereby sound pressure difference between the front and the rear of the DPF 33 is increased.

The purpose of the present invention is to find PM accumulation amount of the DPF 33 from exhaust sound pressure by using such characteristics.

The calculation means 10 calculates PM accumulation amount of the DPF 33 from the sound pressure maps called from the storage means 9 and the measured sound pressure difference so as to judge whether the PM accumulation amount is larger than predetermined value or not.

When the PM accumulation amount of the DPF 33 is larger than the predetermined value, the exhaust gas temperature measurement sensor 36 measures temperature of exhaust gas. When the temperature of exhaust gas is lower than the renewable temperature range lower limit, the exhaust gas temperature raising means 34 is actuated so as to raise temperature of exhaust gas. Accordingly, the DPF 33 is heated by exhaust gas so that the DPF 33 is renewed.

As mentioned above, each of the exhaust gas purification devices 101, 102 and 103 having the DPF 33 disposed in the exhaust system 30 of the internal combustion engine comprises one or more sound pressure measurement means 8F and 8R measuring exhaust sound pressure and the calculation means 10 calculating PM accumulation amount from the measured exhaust sound pressure. Compared with the conventional case of measuring pressure difference, measurement of exhaust sound pressure has high sensitivity and high responsibility. Accordingly, PM accumulation amount is decided in a moment. PM accumulation amount can be decided under transient driving.

The exhaust gas temperature measurement means 36 and the exhaust gas temperature raising means 34 are disposed at the upstream side of the DPF 33. When PM accumulation amount calculated by the calculation means 10 is higher than the predetermined value and exhaust gas temperature measured by the exhaust gas temperature measurement means 36 is lower than the renewable temperature range lower limit of the DPF 33, the exhaust gas temperature raising means 34 is actuated. Accordingly, PM accumulation amount is decided from measured result of exhaust sound pressure having high responsibility and the exhaust gas temperature raising means 34 is actuated frequently, whereby fuel consumption is prevented from being worsened.

Embodiment 2

Next, explanation will be given on the exhaust gas purification device 102 of the second embodiment.

As shown in FIG. 3, with regard to the exhaust gas purification device 102, only the front sound pressure sensor 8F is disposed before, that is, at the upstream side of the DPF 33. Though the disposition position of the front sound pressure sensor 8F is not limited in the embodiment 1, the front sound pressure sensor 8F is disposed only at the upstream side of the DPF 33 in this embodiment, and only change of exhaust sound pressure at the upstream side of the DPF 33 is measured so as to recognize PM accumulation amount of the DPF 33.

That is because exhaust sound generated in the engine becomes to tend to be reflected following increase of PM accumulation amount of the DPF 33 so that exhaust sound pressure at the upstream side of the DPF 33 is changed. In FIG. 3, thick arrows indicate flow of air, and thin arrows indicate flow of signals.

Similarly to the embodiment 1, the calculation means 10 is connected to the storage means 9 and the storage means 9 stores sound pressure maps for the front sound pressure sensor 8F following PM accumulation amount of the DPF 33 experimentally measured previously. In this embodiment, the calculation means 10 recognizes PM accumulation amount of the DPF 33 only from exhaust sound pressure at the upstream side of the DPF 33 measured by the front sound pressure sensor 8F based on later-discussed sound pressure maps.

The sound pressure maps are conversion tables from exhaust sound pressure, measured by the front sound pressure sensor 8F to PM accumulation amount of the DPF 33 and is made experimentally about engine rotation speed, torque and exhaust gas temperature. The calculation means 10 selects the optimum sound pressure map stored in the storage means 9 based on engine rotation speed, torque and the like at the time of measurement, and calculates PM accumulation amount of the DPF 33 from sound pressure measured by the front sound pressure sensor 8F by using the sound pressure map.

For reference, FIG. 5 shows sound pressure corresponding to engine rotation speed and torque measured by the front and rear sound pressure sensors 8F and 8R in the state that PM is not accumulated in the DPF 33.

The calculation means 10 calculates PM accumulation amount of the DPF 33 from exhaust sound pressure measured by the front sound pressure sensor 8F and the sound pressure map, and when the PM accumulation amount is larger than the predetermined value, the exhaust gas temperature measurement sensor 36 measures temperature of exhaust gas. When the temperature of exhaust gas is lower than the renewable temperature range lower limit, the exhaust gas temperature raising means 34 is actuated so as to raise temperature of exhaust gas.

Accordingly, the DPF 33 is heated by exhaust gas so that the DPF 33 is renewed.

As mentioned above, the storage means 9 storing the sound pressure map of the upstream side of the DPF 33 corresponding to driving state of the internal combustion engine is disposed. The one sound pressure measurement means 8F is disposed at the upstream side of the DPF 33. The calculation means 10 calculates PM accumulation amount from exhaust sound pressure measured by the sound pressure measurement means 8F and the sound pressure map. Accordingly, PM accumulation amount of the DPF 33 is recognized by disposing the one sound pressure measurement means 8F so as to reduce cost.

Embodiment 3

Next, explanation will be given on the exhaust gas purification device 103 of the third embodiment.

As shown in FIG. 4, with regard to the exhaust gas purification device 103, only the sound pressure sensor 8R is disposed behind, that is, at the downstream side of the DPF 33. Though the disposition position of the front sound pressure sensor 8F is not limited in the embodiment 1, the rear sound pressure sensor 8R is disposed only at the downstream side of the DPF 33 in this embodiment, and only change of exhaust sound pressure at the downstream side of the DPF 33 is measured so as to recognize PM accumulation amount of the DPF 33.

That is because exhaust sound generated in the engine becomes to tend to be screened by the DPF 33 following increase of PM accumulation amount of the DPF 33 so that exhaust sound pressure at the downstream side of the DPF 33 is changed. In FIG. 4, thick arrows indicate flow of air, and thin arrows indicate flow of signals.

The calculation means 10 is connected to the storage means 9 and the storage means 9 stores sound pressure maps for the rear sound pressure sensor 8R following PM accumulation amount of the DPF 33 experimentally measured previously.

The calculation means 10 calculates PM accumulation amount of the DPF 33 only from the sound pressure maps and exhaust sound pressure at the downstream side of the DPF 33 measured by the rear sound pressure sensor 8R.

The sound pressure maps are conversion tables from exhaust sound pressure measured by the rear sound pressure sensor 8R to PM accumulation amount of the DPF 33 and is made experimentally about engine rotation speed, torque and exhaust gas temperature. The calculation means 10 selects the optimum sound pressure map stored in the storage means 9 based on engine rotation speed, torque and the like at the time of measurement, and calculates PM accumulation amount of the DPF 33 from sound pressure measured by the rear sound pressure sensor 8R by using the sound pressure map.

The calculation means 10 calculates PM accumulation amount of the DPF 33 from exhaust sound pressure measured by the rear sound pressure sensor 8R and the sound pressure map, and when the PM accumulation amount is larger than the predetermined value, the exhaust gas temperature measurement sensor 36 measures temperature of exhaust gas. When the temperature of exhaust gas is lower than the renewable temperature range lower limit, the exhaust gas temperature raising means 34 is actuated so as to raise temperature of exhaust gas. Accordingly, the DPF 33 is heated by exhaust gas so that the DPF 33 is renewed.

As mentioned above, the storage means 9 storing the sound pressure map of the upstream side of the DPF 33 corresponding to driving state of the internal combustion engine is disposed. The one sound pressure measurement means 8R is disposed at the downstream side of the DPF 33. The calculation means 10 calculates PM accumulation amount from exhaust sound pressure measured by the sound pressure measurement means 8R and the sound pressure map. Accordingly, PM accumulation amount of the DPF 33 is recognized by disposing the one sound pressure measurement means 8R so as to reduce cost.

Next, explanation will be given on a frequency band measured by sound pressure measurement according to the present invention.

As frequency measured in the vicinity of the DPF 33, exhaust sound pressure of all the frequency band which can be measured by the sound pressure sensors 8F and 8R may be measured. Alternatively, sound pressure of a part of the frequency band which can be measured by the sound pressure sensors 8F and 8R may be measured.

Namely, amplitude of all the sound pressure detected by the sound pressure sensors 8F and 8R may be measured without limiting frequency, or sound pressure may be measured in a part of the frequency band that correlation coefficient of sound pressure with PM accumulation amount of the DPF 33 is high. The part of the frequency band with high correlation coefficient is experimentally determined previously with respect to the working status of the engine, and the range of the frequency band is stored in the storage means 9.

As shown in FIG. 6, when exhaust sound pressure is measured in all the measurable frequency bands, measured pressure difference varies widely, but is hardly to be influenced by engine rotation speed and torque. When exhaust sound pressure is measured in the part of the frequency band, that is, when exhaust sound pressure is measured without the band that correlation to accumulation amount of the DPF 33 is low, dispersion of measured pressure difference is small.

As mentioned above, exhaust sound pressure is measured in all the measurable frequency band or a part of the frequency bands of the sound pressure measurement means 8F and 8R. Accordingly, accuracy of sound pressure measurement is improved without revising influence of rotary speed.

Frequency at which correlation of sound pressure or sound pressure difference to PM accumulation amount of the DPF 33 is high is different about engine rotation speed and torque. As an example, FIG. 7 shows results of measurement of exhaust sound pressure about two types of frequency in the case that rotation speed is 2400/min as relation of working time of the DPF 33 and sound pressure difference between the front and rear sides. With regard to the results of measurement of exhaust sound pressure difference that frequency is 160 Hz, sound pressure difference between the front and rear sides measured by the sound pressure sensors 8F and 8R is increased following progress of clogging of the DPF 33. However, with regard to results of measurement of exhaust sound pressure difference that frequency is 80 Hz, sound pressure difference between the front and rear sides is hardly changed.

Namely, in the case that rotation speed is 2400/min, accurate PM accumulation amount of the DPF 33 is recognized by measurement of exhaust sound pressure difference that frequency is 160 Hz. However, since change of sound pressure difference is small in measurement of exhaust sound pressure difference that frequency is 160 Hz, accurate PM accumulation amount of the DPF 33 may not be recognized.

Then, the storage means 9 stores the optimum frequency band for measurement of the DPF 33 corresponding to engine rotation speed and torque. In particular, the storage means 9 stores frequency band with high correlation coefficient between exhaust sound pressure or exhaust sound pressure difference and PM accumulation amount of the DPF 33 corresponding to engine rotation speed and torque, and the sound pressure sensors 8F and 8R select frequency band with high correlation from a plurality of frequency bands or combine the frequency bands corresponding to engine rotation speed and torque and measure exhaust sound pressure or exhaust sound pressure difference. Subsequently, the calculation means 10 calculates PM accumulation amount from a plurality of the exhaust sound pressure or exhaust sound pressure difference based on the sound pressure map.

As mentioned above, exhaust sound pressure is measured by the sound pressure measurement means 8F and 8R about a plurality of frequency bands, and the calculation means 10 calculates PM accumulation amount from the sound pressure of a plurality of the frequency bands. Accordingly, sound pressure is measured accurately.

The frequency band of the sound pressure measured by the sound pressure measurement means 8F and 8R is changed following rotation speed of the internal combustion engine. Accordingly, sound pressure is measured accurately as shown in the comparison in FIG. 7.

Propagation characteristic of exhaust sound pressure propagated by exhaust gas is different based on temperature of the exhaust gas. Accordingly, a frequency band with high correlation coefficient between exhaust sound pressure or exhaust sound pressure difference and PM accumulation amount of the DPF 33 is different based on temperature of exhaust gas. Then, the storage means 9 stores frequency band with high correlation coefficient between exhaust sound pressure or exhaust sound pressure difference and PM accumulation amount of the DPF 33 based on temperature of exhaust gas.

The exhaust gas temperature measurement sensor 36 measures temperature of exhaust gas, and the sound pressure sensors 8F and 8R and the calculation means 10 measure exhaust sound pressure or exhaust sound pressure difference of the optimum frequency band corresponding to the temperature of exhaust gas so as to calculate PM accumulation amount of the DPF 33.

As mentioned above, the frequency band of the exhaust sound pressure measured by the sound pressure measurement means 8F and 8R is changed following temperature of exhaust gas. Accordingly, sound pressure is measured accurately.

INDUSTRIAL APPLICABILITY

The present invention is adoptable to an exhaust gas purification device comprising a particulate filter, collecting particulate matter in exhaust gas, and disposed in an exhaust system of an internal combustion engine such as a diesel engine.

The invention claimed is:

1. An exhaust gas purification device disposed in an exhaust system of an internal combustion engine, comprising:
  a diesel particular filter (DPF);
  a sound pressure measurement means for measuring an exhaust sound pressure that is an actual sound pressure of exhaust gas on at least one of upstream and downstream sides of the DPF;
  a storage means for storing sound pressure maps for converting a sound pressure of exhaust gas passed through the DPF into a particulate matter (PM) accumulating amount in the DPF,
  wherein the sound pressure maps are prepared so as to correspond to various driving states of the internal combustion engine defined by different temperatures of exhaust gas; and
  a calculation means for calculating a PM accumulation amount from the exhaust sound pressure measured by the sound pressure measurement means and from the sound pressure maps,
  wherein the calculation means selects an optimal sound pressure map among the stored sound pressure maps so as to correspond to an actual driving state of the internal combustion engine.

2. The exhaust gas purification device as set forth in claim 1, further comprising:
  an exhaust gas temperature measurement means for measuring an exhaust gas temperature on the upstream side of the DPF; and
  an exhaust gas temperature raising means disposed at an upstream side of the DPF,
  wherein, when the PM accumulation amount calculated by the calculation means is higher than a predetermined value and the exhaust gas temperature measured by the exhaust gas temperature measurement means is lower than a renewable temperature range lower limit of the DPF, the exhaust gas temperature raising means is actuated to raise the exhaust gas temperature.

3. The exhaust gas purification device as set forth in claim 1, wherein:
  first and second sound pressure measurement means are disposed at the upstream side of the DPF and at the downstream side of the DPF, respectively, so as to each serve as the at least one sound pressure measurement means,
  the calculation means calculates a differential exhaust sound pressure between the exhaust sound pressure measured by the first sound pressure measurement means and the exhaust sound pressure measured by the second sound pressure measurement means, and
  the conversion table of the sound pressure map converts the differential exhaust sound pressure into a PM accumulating amount in the DPF.

4. The exhaust gas purification device as set forth in claim 1, wherein the sound pressure measurement means measures the exhaust sound pressure in a full range of measurable frequency bands.

5. The exhaust gas purification device as set forth in claim 1, wherein the sound pressure measurement means measures respective exhaust sound pressures in a plurality of frequency bands, and
   wherein the calculation means calculates the PM accumulation amount from the sound pressures in the plurality of the frequency bands.

6. The exhaust gas purification device as set forth in claim 1, wherein a frequency band of the exhaust sound pressure measured by the sound pressure measurement means is changed following change of rotation speed of the internal combustion engine.

7. The exhaust gas purification device as set forth in claim 1, wherein a frequency band of the exhaust sound pressure measured by the sound pressure measurement means is changed following change of temperature of exhaust gas.

8. The exhaust gas purification device as set forth in claim 1, wherein the sound pressure measurement means measures the exhaust sound pressure in a part range of measurable frequency band.

* * * * *